United States Patent
Keeler et al.

(10) Patent No.: US 7,263,650 B2
(45) Date of Patent: Aug. 28, 2007

(54) ERROR CORRECTION EXTENDING OVER MULTIPLE SECTORS OF DATA STORAGE

(75) Inventors: Stanton M. Keeler, Longmont, CO (US); Curtis M. Pleiss, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 476 days.

(21) Appl. No.: 10/880,794

(22) Filed: Jun. 30, 2004

(65) Prior Publication Data
US 2006/0005068 A1    Jan. 5, 2006

(51) Int. Cl.
G11C 29/00    (2006.01)

(52) U.S. Cl. .................................................. 714/769
(58) Field of Classification Search ................ 714/762, 714/769
See application file for complete search history.

(56) References Cited

U.S. PATENT DOCUMENTS

| | | | |
|---|---|---|---|
| 5,467,361 A | 11/1995 | Shipman | |
| 5,517,484 A | 5/1996 | Takagi | |
| 5,602,857 A | 2/1997 | Zook | |
| 5,844,919 A | 12/1998 | Glover | |
| 6,125,469 A | 9/2000 | Zook | |
| 6,219,814 B1 | 4/2001 | Darrel | |
| 6,729,709 B2 | 7/2001 | Konno | |
| 6,981,197 B2 | 1/2002 | Liu et al. | |
| 6,345,366 B1 | 2/2002 | Asano | |
| 6,661,758 B2* | 12/2003 | Sako et al. | 369/53.35 |
| 6,903,887 B2* | 6/2005 | Asano et al. | 360/31 |
| 7,038,993 B2* | 5/2006 | Minamino et al. | 369/59.25 |
| 7,080,306 B1* | 7/2006 | Sugawara et al. | 714/755 |

* cited by examiner

*Primary Examiner*—Shelly Chase
(74) *Attorney, Agent, or Firm*—Westman, Champlin & Kelly, P.A.

(57) ABSTRACT

A method and an apparatus for storing a superblock of data codewords. The method includes providing sectorwise error correction codes in the data codewords. The method also includes generating superblock error correction codes as functions of the data codewords. The method includes storing the data codewords and the superblock error correction codes in a plurality of sectors in a storage medium.

24 Claims, 6 Drawing Sheets

ERROR CORRECTION EXTENDING OVER MULTIPLE SECTORS OF DATA STORAGE

FIELD OF THE INVENTION

The present invention relates generally to error handling in data storage devices, and more particularly but not by limitation to error handling of large error bursts that are not corrected by on-the-fly error handling.

BACKGROUND OF THE INVENTION

Typical ECC error correction systems used in magnetic disc drives correct error bursts that occur relatively frequently and that are of short in duration in comparison to the sector size. The ECC system operates on a single data sector in which the error burst occurs. The ECC system performs corrections on-the-fly to the user data, which is to say that the corrections are completed without significantly interrupting the flow of the data stream as it is sent from the magnetic disc drive to a host system.

There are, however, types of errors that occur in magnetic disc drives that are larger. Traditionally, these types of errors have been corrected using creative reread (read retry) mechanisms that rely on modifying read channel parameters or head re-positioning schemes to recover the faulty data. If the error is such that these retry schemes are not effective, then the drive has exhausted its ability to recover the data. The user's data is lost.

Embodiments of the present invention provide solutions to these and other problems, and offer other advantages over the prior art.

SUMMARY OF THE INVENTION

Disclosed are a method and an apparatus for storing a superblock of data codewords. The method includes providing sectorwise error correction codes in the data codewords. The method also includes generating superblock error correction codes as functions of the data codewords. The method includes storing the data codewords and the superblock error correction codes in a plurality of sectors in a storage medium.

Other features and benefits that characterize embodiments of the present invention will be apparent upon reading the following detailed description and review of the associated drawings.

DETAILED DESCRIPTION OF ILLUSTRATIVE EMBODIMENTS

There are two classes of error bursts that can lead to lost user data when using conventional error correction methods. One class, catastrophic failures, render large segments of user data unrecoverable. Another class includes error bursts that are much longer in duration than the typical error event and that can't be corrected using conventional error correction methods. An example of a catastrophic failure is a damaged head, and an example of a long duration error burst would be a dislodged particle from the interior of the disc drive that had settled on the media at some point after the drive left the factory. In the embodiments described below, a method and apparatus are disclosed that corrects error bursts that are too long to correct using conventional error correction techniques. In the embodiments described below, error correction codes are provided for a superblock of multiple sectors. When an error burst is encountered that is too long to be corrected by conventional techniques, then a second tier correction using the superblock error correction codes is performed to correct the long error burst. Correction is not done on-the-fly, but in a second tier subsystem that requires some delay or interruption to process the error correction.

Figure 1:
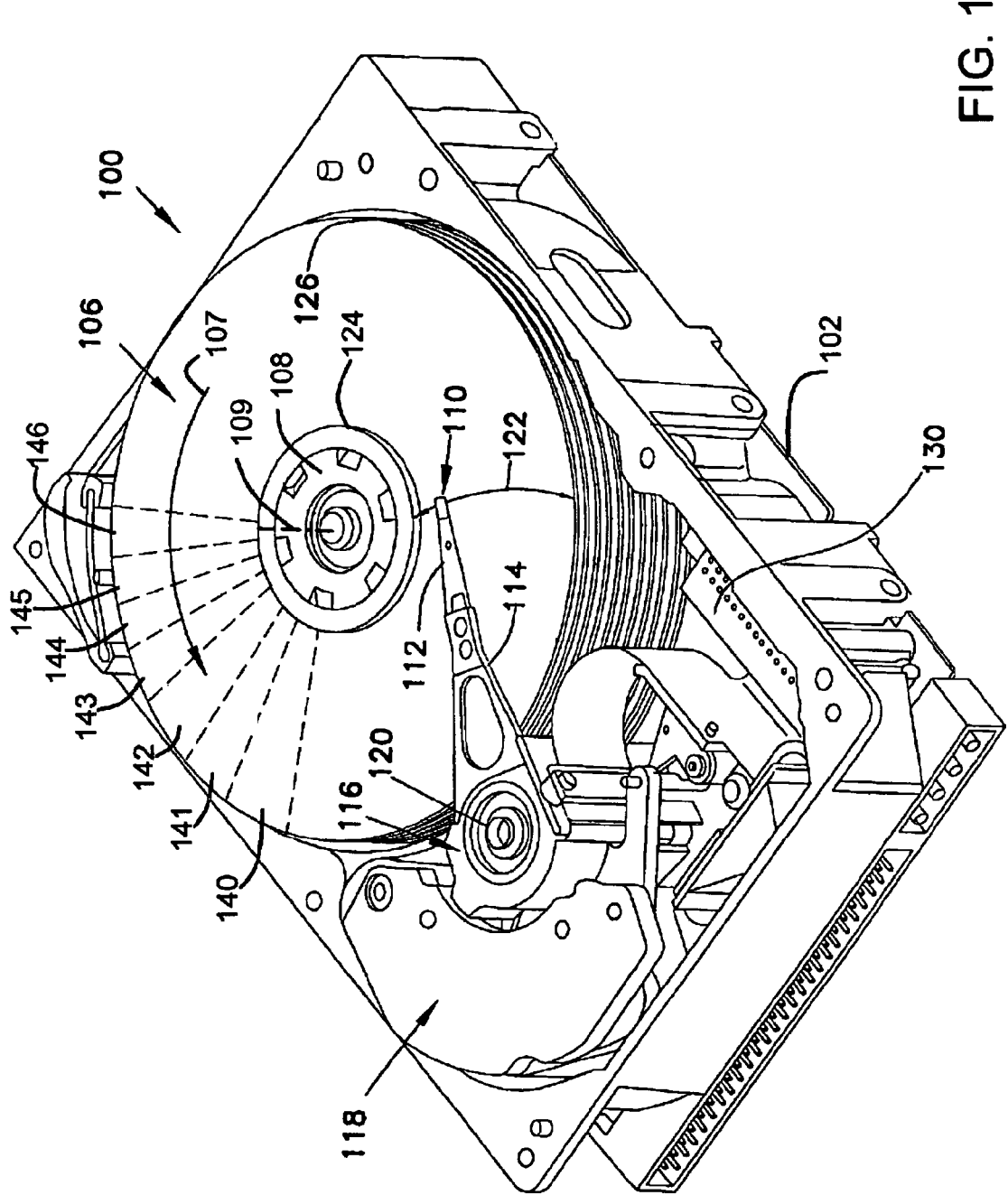
FIG. 1 is an oblique view of a disc drive.

FIG. 1 is an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction 107 about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by electronics 130 based on signals generated by heads 110 and a host computer (not shown).

The disc drive 100 is useful as one type of a data storage device. The disc pack 106 is one type of a storage medium, and each disc in the disc pack 106 is logically divided into a plurality of sectors such as sectors 140-146 illustrated in FIG. 1. A group of sectors 140-146 are logically arranged together to store a superblock of data. The superblock comprises sectors 140-146. The superblock comprises sectors of data codewords that include sectorwise error correction codes. The superblock also comprises sectors of superblock error correction codes that are functions of the data codewords. The number of sectors shown in the superblock is merely exemplary, and the number can be selected to suit a particular data storage device size. The arrangement of sectors in a superblock is described in more detail below in connection with an example illustrated in FIG. 3.

The slider 110 includes a read head that operates in cooperation with portions of electronics 130 to form a readback device. The readback device retrieves a selected sector from the superblock. The electronics 130 portion of the readback device performs on-the-fly error correction with sectorwise error correction codes. The electronics 130 portion of the readback device also performs superblock error correction (second tier correction) using the superblock error correction codes. The on-the-fly correction and superblock error correction are described in more detail below in connection with an example illustrated in FIGS. 5A, 5B.

Figure 2A:
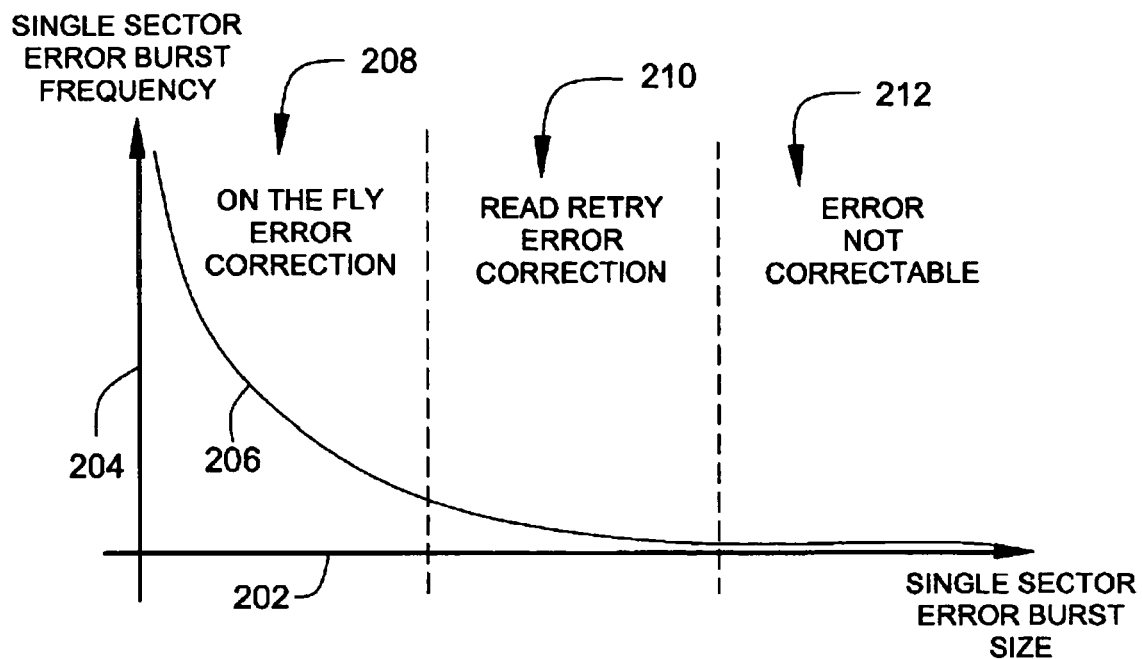
FIG. 2A illustrates a graph of PRIOR ART error handling methods as a function of error burst size.

FIG. 2A illustrates a graph of PRIOR ART error handling methods as a function of error burst size. A horizontal axis 202 represents a size of an error burst and a vertical axis 204 represents a statistical frequency of occurrence of the error burst. As indicated by curve 206, there are relatively larger numbers of short error bursts and relatively smaller numbers of long error bursts. In a lowest range 208 of error burst size, errors are corrected using a conventional on-the-fly error correction technique. In a mid range 210 of error burst size, errors are corrected using read retry error correction techniques. The read retry error technique is undesirable because requires a time-consuming re-reading of a sector of the storage medium, and a smooth flow of data to a host system is interrupted. For a high range 212 of error burst size, the redundancy of data within a sector is not high enough to correct the error burst and an error occurs.

Figure 2B:
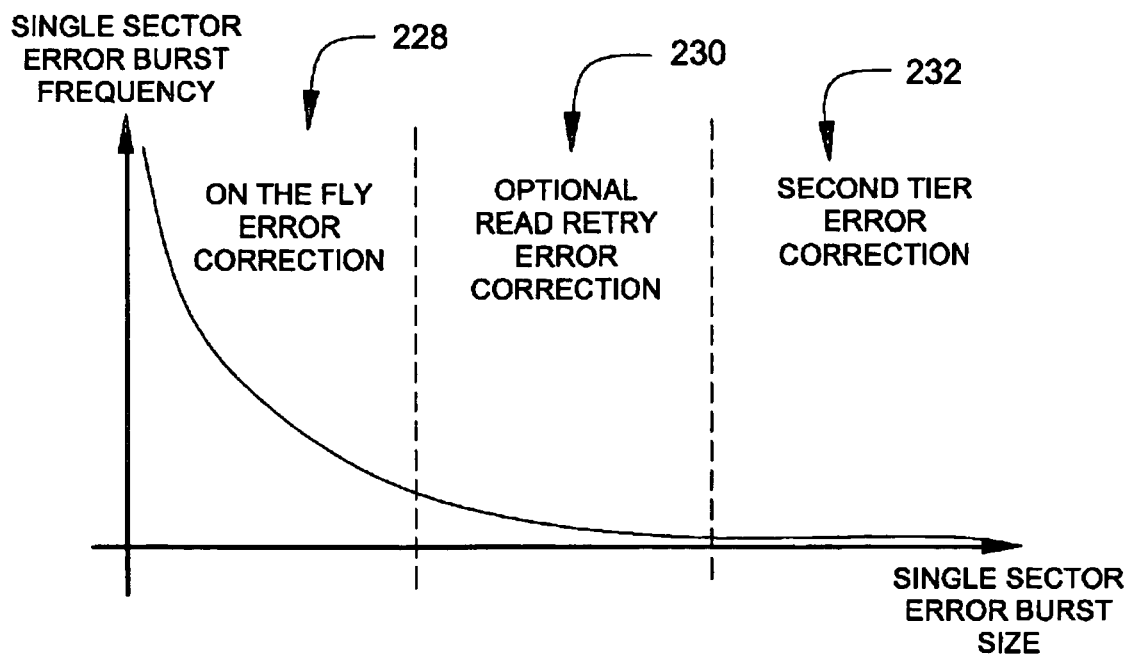
FIG. 2B illustrates a graph of error handling methods that include second tier error correction process for a limited range of error burst sizes.

FIG. 2B illustrates a graph of error handling methods that include second tier error correction process for a limited range of error burst sizes. In FIG. 2B, on-the-fly error correction 228 is performed first, then, as an option, read retry error correction 230 can be performed, and then second tier error correction 232 is performed. The use of the second tier error correction 232 corrects error bursts that are too long for the on-the-fly correction 228. Details of the second tier error correction are described in more detail below by way of examples illustrated in FIGS. 3, 4, 5A and 5B.

The total set of possible, non-catastrophic errors can be separated into two basic classes: frequent error events and infrequent error events. With this classification, a two-tier ECC correction system is implemented. The first tier is an on-the-fly ECC subsystem which corrects the frequent error events and assigns ECC bytes to each sector of the disc. A second tier ECC subsystem then corrects any infrequent error events that cannot be corrected using the first tier ECC. This second ECC subsystem takes advantage of the lower frequency of its assigned error types. The added error correction words necessary for such a second tier ECC system can be amortized over a much larger area of the disc as the probability of two such infrequent errors occurring twice during the read of the relevant data is extremely small. In addition, this second tier ECC subsystem can be designed to handle a much larger number of bytes in error (per error burst) since the necessary ECC overhead can be amortized over such a large data area. Another advantage with regards to these lower frequency error events is that the correction time can be much longer than allowed for first tier error events.

Figure 3:
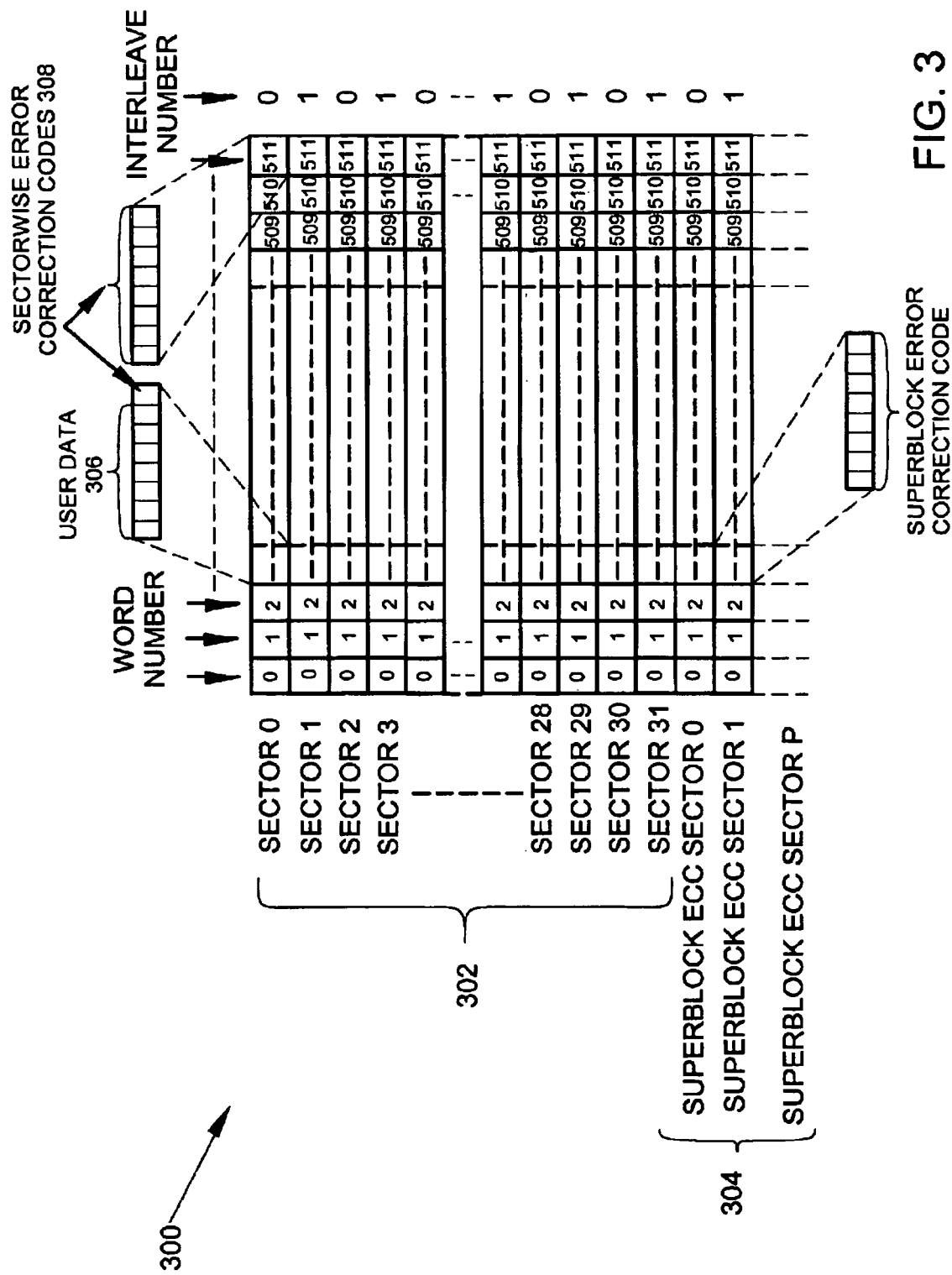
FIG. 3 illustrates a superblock with multiple interleaved data sectors and multiple superblock error correction sectors.

FIG. 3 illustrates a superblock 300 with multiple interleaved data sectors 302 and multiple interleaved superblock error correction sectors 304. The superblock comprises a large number of data codewords such as exemplary codeword 306 in data sector 0. The codeword 306 comprises multiple bits of user data and also one or more bits of sectorwise error correction code 308. The sectorwise error correction code 308 is typically a parity bit or a checksum code. Data sector 0 can also include some words, such as word number 511 that include only sectorwise error correction codes 308. The sectorwise error correction codes 308 are typically two dimensional and organizes the sector in logic rows and columns with parity bits provided for both the rows and the columns. The term "sectorwise," as used in this application, refers to error correction codes calculated as functions of data within a single sector. Sectorwise error correction codes 308 do not extend across a sector boundary into another sector.

As explained above in connection with FIGS. 2A, 2B, sometimes error bursts are so large as to be not correctable by sectorwise error correction methods. The superblock error correction codes 304 are calculated as a function of data codewords that extend across multiple sectors 302. The superblock error correction codes 304 are used to correct larger error bursts that are not correctable by the sectorwise error correction codes 308.

As explained above in connection with FIG. 1, the sectors 302 of data codewords and the sectors 304 of superblock error correction codes are stored in a plurality of sectors in a storage medium.

In a preferred arrangement, the superblock error correction codes 304 are generated as interleaved functions of the data codewords. Interleaving tend to spread out the error correction codes across multiple superblock sectors which increases the probability that the superblock error correction can correct the errors in the error burst.

In one example, there is an even (sector 0) superblock error correction code that are calculated as a function of data code words in data sectors 302 that have interleave number 0. There is also an odd (sector 1) superblock error correction code that are calculated as a function of data code words in data sectors 302 that have interleave number 1.

In another example, the number of interleaves can be P where P is three or more. The number of interleaves can be increased to three or more to spread error bursts across larger numbers of superblock error correction sectors. Parity codes, checksum codes or other known error correction codes can be used for the superblock error correction codes 304.

A superblock can contain more than two interleaved sets of sectors; in the case of p=3 (i.e., 4 interleaves), codewords would be formed from sectors 0, 4, 8, 12, etc., 1, 5, 9, 13, etc., 2, 6, 10, 14, etc. and 3, 7, 11, 15, etc. The number of sectors N in a superblock can also vary. There is no mathematical limit to the number of bytes within a codeword although there are a number of practical limits on the sizes of the interleaved codewords.

Figure 4:
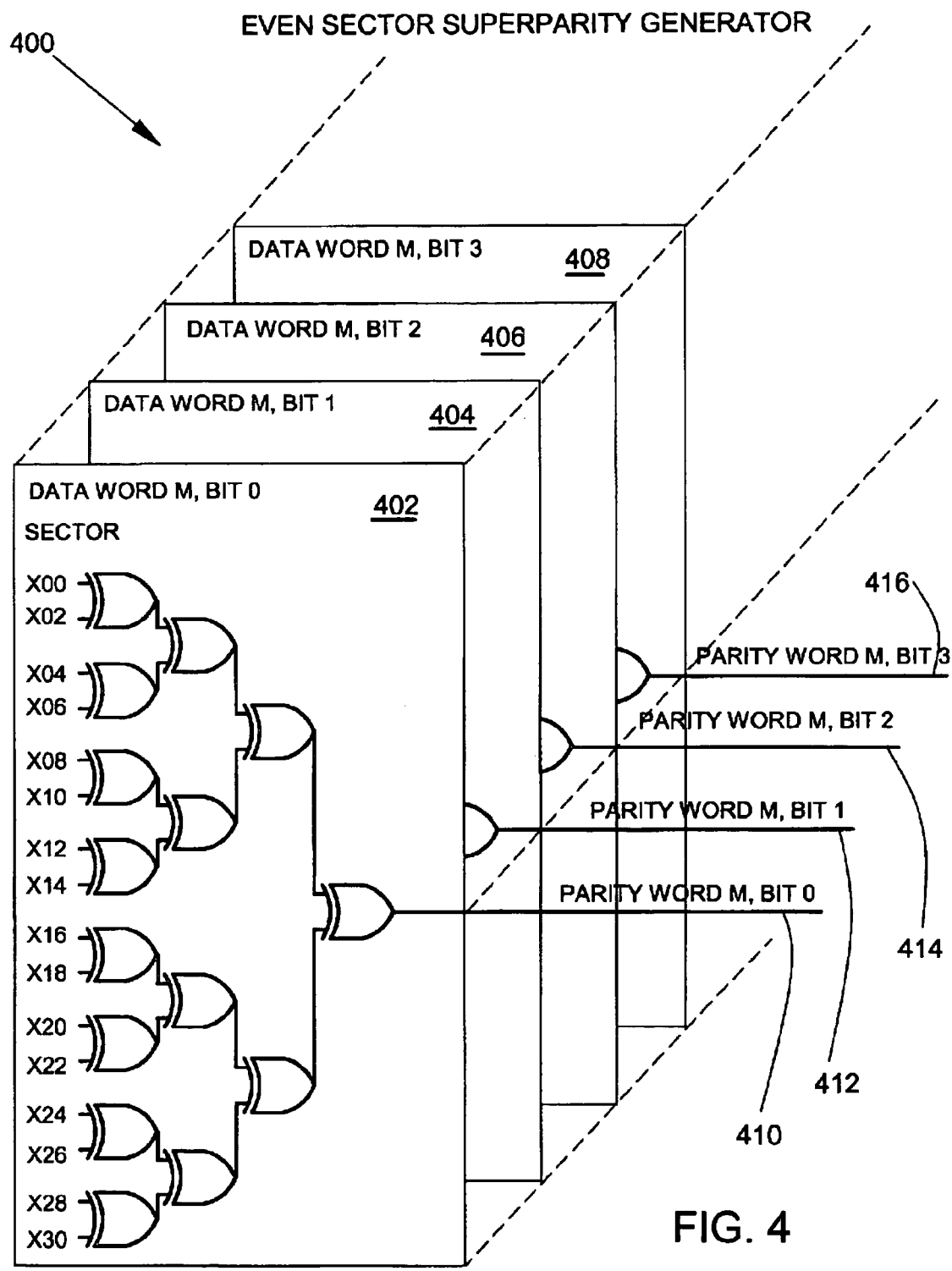
FIG. 4 schematically illustrates an even sector superparity generator.

FIG. 4 schematically illustrates an even sector superparity generator 400. The even sector superparity generator 400 receives bits of data X00, X02, X04, X06, . . . X30 from a word in a correspondingly even numbered data sectors 0, 2, 4, 6, . . . 30 such as data sectors 302 (FIG. 3). The even sector parity generator 400 includes a number of odd parity calculation circuits 402, 404, 406, 408. The number of odd parity calculation circuits is equal to the number of bits per word used in the storage system. Each parity calculation circuit (402, 404, 406, 408) receives a particular bit number of data (such as bit 0, 1, 2, 3) and provides a corresponding parity bit output 410, 412, 414, 416 of the same bit number. The parity bits output are assembled to form a word in a superblock error correction code (such as superblock ECC sector 0 in FIG.3). Each parity calculation circuit (402, 404, 406, 408) includes a number of XOR gates as illustrated.

FIG. 4 is exemplary of a superparity error correction calculation. It is understood that similar calculation is done for an odd sector superparity error correction code. It is also understood that the details of the circuit can vary as need to calculate even parity, odd parity, checksum or other known error correction code. It is also understand that, while the realization illustrated in FIG. 4 is a hardware realization, that the superparity error calculations can be done by any suitable combination of hardware, firmware and software.

The superblock error correction arrangement in FIG. 4 associates N sets of data sectors with numbered parity sectors assigned to each set. An example of the organization of these sets, called superblocks, is shown in FIG. 3. In FIG. 3, examples of a superblock with N=32 and p=2, . . . P is shown. Each row comprises user data assigned to a normal sector, in this case 512 bytes of user data. Each column consists of p interleaved codewords. In FIG. 3, each byte x of every even sector comprises one codeword while each byte x of every odd sector comprises a different codeword. Each codeword has associated with it exactly one superblock error correction byte calculated by exclusive-ORing (XOR-ing) every byte x of the appropriate interleaved sector with every other byte x of the sectors which are members of that codeword. For example, in the case diagrammed in FIG. 4, byte 0 of sector 0 is XOR-ed with byte 0 of sectors 2, 4, 6, etc., up to and including sector 30. The result of these XOR operations is byte 0 of Parity Sector 0. The same operation is done for byte 0 of the odd sectors: sectors 1, 3, 5 . . . 31 and the result is byte 0 of Parity Sector 1. These operations are repeated for all bytes of each sector. The resulting parity bytes form two new sectors of parity that are appended to the original 32 sectors of user data. These 34 sectors form a superblock in this example. Various data storage systems may have different number of bits per word, different number of words per sector, and different numbers of interleaves can be selected to meet the needs of a particular application.

Figure 5A:
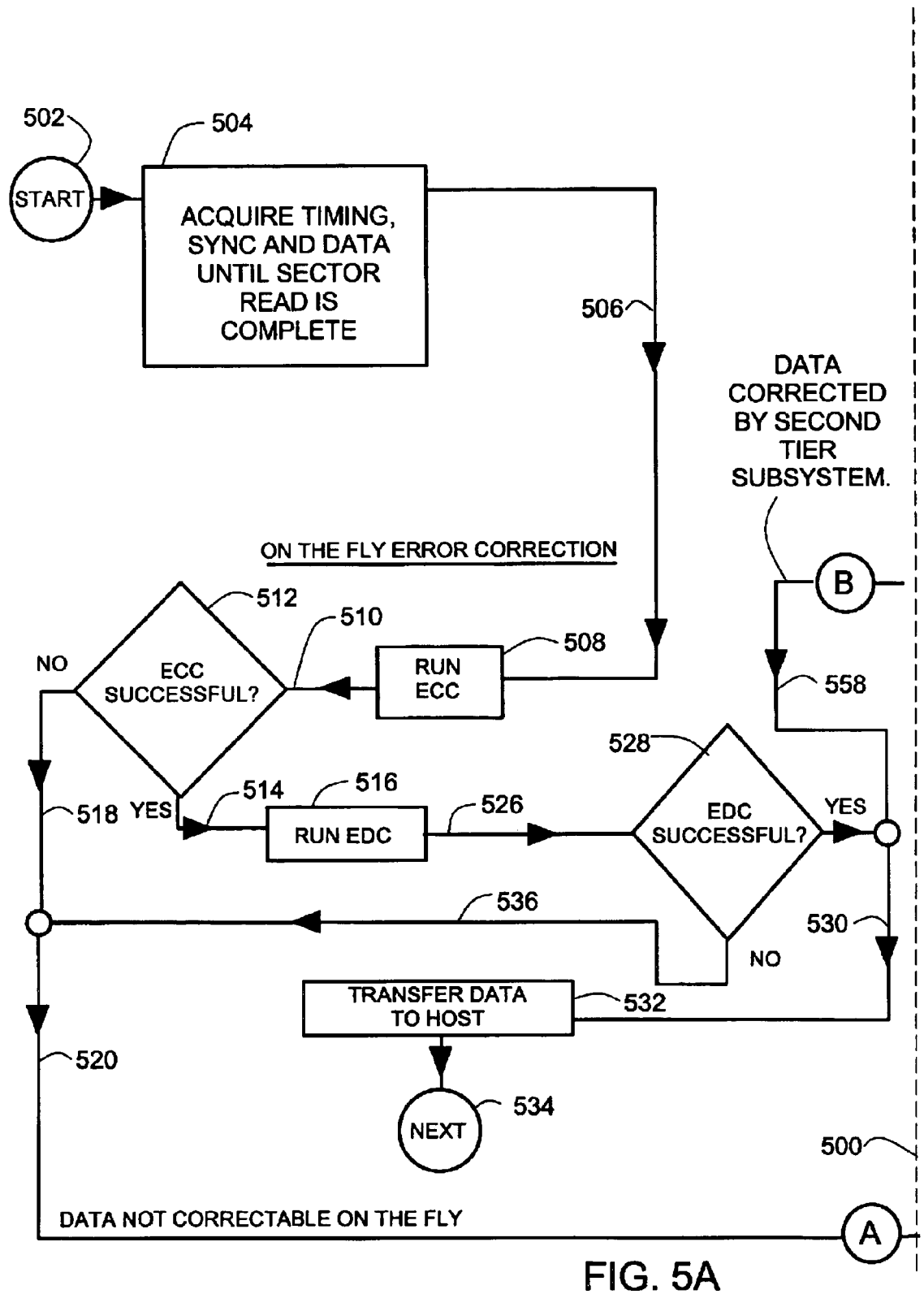
FIGS. 5A, 5B, taken together, illustrate a process flow chart including on-the-fly and second tier error correction process.
Figure 5B:
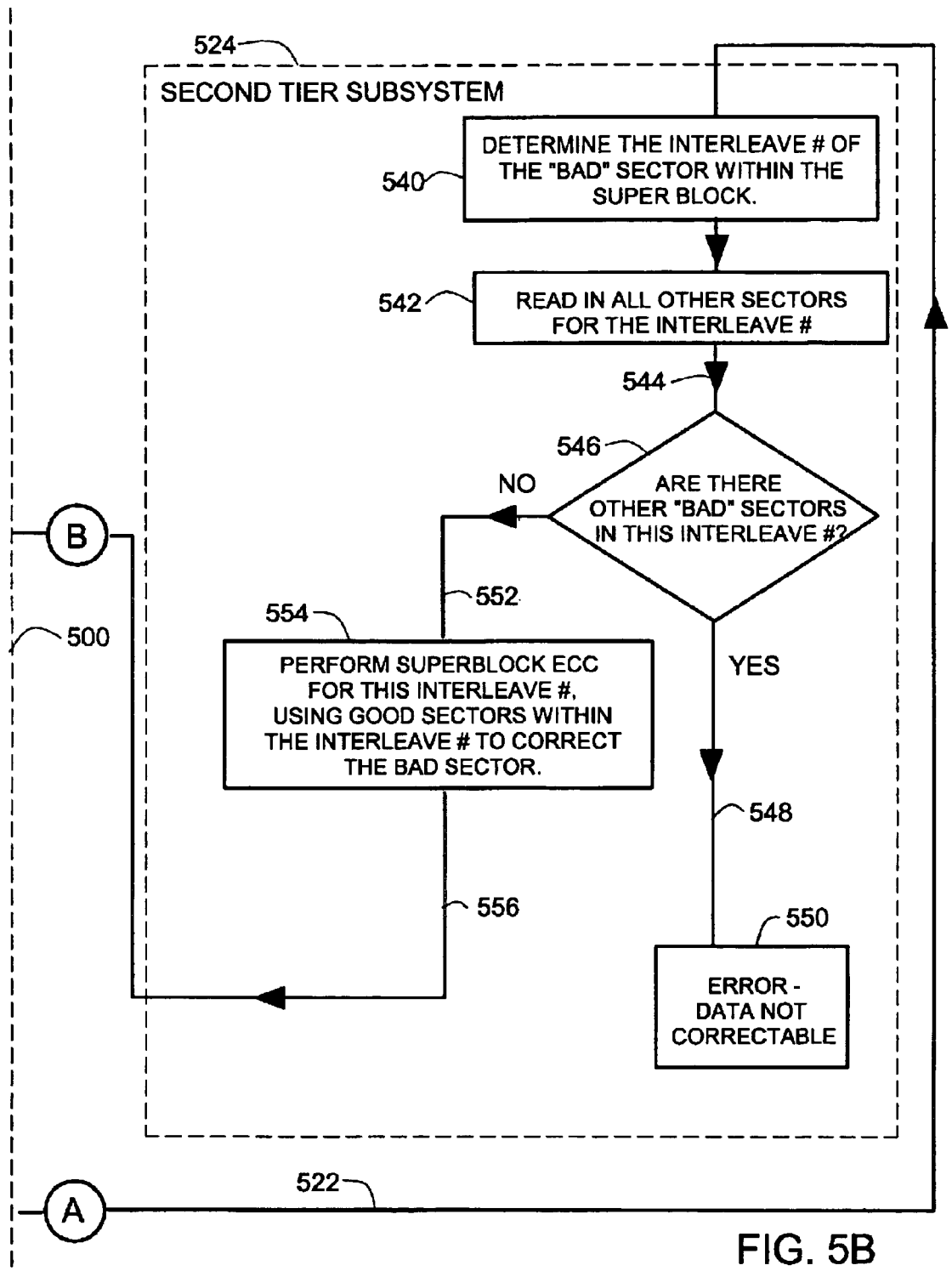

FIGS. 5A, 5B, taken together, illustrate a process flow chart including a second tier error correction process. FIG. 5A can be joined to FIG. 5B along a dashed line 500 that is common to both drawings. Transfer bubbles A and B indicate lines of process flow that connect FIGS. 5A, 5B. FIGS. 5A, 5B illustrate a method of retrieving selected data codewords from a superblock stored in multiple sectors of a storage medium.

The process starts at START 502 and continues to action block 504. At action block 504, a sector of data codewords is read. The process of reading includes acquiring timing, synchronization and data until a complete sector is read. The sector of data codewords that are read may includes some errors.

After completion of action block 504, the process continues along line 506 to an action block 508. At action block 508, a sectorwise error correction code (ECC) process is completed and the process then continues along line 510 to decision block 512. At decision block 512, the sector of data codewords is tested to find out if the sectorwise error correction process was successful. If the sectorwise error correction process was found successful at decision block 512, then the process continues along line 514 to action block 516. If the sectorwise error correction process was found to be not successful at decision block 512, then the process continues on lines 518, 520, transfer bubble A, and line 522 to a second tier subsystem 524. At line 520, an optional read retry error correction step can be included.

At the action block 516, an additional sectorwise error detection code (EDC) process is completed and the process continues along line 526 to decision block 528. At decision block 528, the sector of data codewords is tested to find out if the sectorwise EDC process was successful. If the sectorwise EDC process is found to be successful at decision block 528, then the process continues along line 530 to action block 532. At action block 532, the sector of data codewords is transferred to the host computer. After transfer to the host computer, then the system is ready to process a next data sector at 534. This completes the sectorwise error correction process. If the EDC process is found to be not successful at decision block 528 then the process continues along lines 536, 520, transfer bubble A and the line 522 to the second tier subsystem 524.

The processes completed in FIG. 5A comprise an on-the-fly sectorwise error correction of the selected data codewords using sectorwise error correction.

If the sectorwise error correction is unsuccessful, then program flow continues along line 522 to invoke the second tier subsystem 524 which provides superblock error correction.

In the second tier subsystem 524 the process begins at line 522 and continues to action block 540. At action block 540, a first superblock error correction sector determined to be associated with the error is read. After completion of action block 540, the process continues to action block 542. At action block 542, data codewords in a first portion of the superblock associated with the first superblock error correction sector are read. The superblock sector and the portions of the data sector read are those associated with an interleave number determined to be associated with the interleave portion that is bad (has an error burst).

Program flow then continues along line 544 to decision block 546. At decision block 546, the portions read at action blocks 540, 542 are tested to find out if there are any other error bursts present. If, there are other error bursts present, the second tier correction can't be made, and the program flow continues along line 548 to an error trap action block at 550. If there are no other error bursts present, then program flow continues from decision block 546 along line 552 to action block 554. At action block 554, superblock error correction is performed to correct the error burst and then program flow continues along line 556, transfer bubble B, line 558 and line 530 to transfer the corrected data sector to the host at action block 532.

Referring now to both FIGS. 3 and 5A-5B, A second tier error correction method comprises storing data with on-the-fly correction codes and with interleaved correction codes covering blocks of multiple sectors. The second tier error correction method also comprises reading a selected sector and, upon failure of on-the-fly error correction, finding an interleave number of the selected sector.

The second tier error correction method also comprises reading remaining sectors with the interleave number and checking for on-the-fly errors in the remaining sectors; and if no errors are found in the remaining sectors, performing error correction of the failed sector with the interleaved correction codes.

This superblock method can correct an entire corrupted sector per interleave and per superblock. For example, the superblock shown in FIG. 3 can completely correct any single 'bad' sector from the even set of sectors (0, 2, 4, 6, etc.) and completely correct any single 'bad' sector from the odd set of sectors (1, 3, 5, 9, etc.). A 'bad' sector is a sector that cannot be corrected using the normal on-the-fly ECC associated with every sector contained within the superblock.

This concept can also encompass ECC calculations for the columns of the superblock as opposed to the simple parity discussed above. Such a system address the limitation of correcting only one sector per interleave.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the error correction system while maintaining substantially the same functionality without departing from the scope of the present invention. In addition, although the preferred embodiment described herein is directed to a magnetic disc drive system for non-volatile storage, it will be appreciated by those skilled in the art that the teachings of the present invention can be applied to correction of errors in volatile memory or dynamic memory, without departing from the scope of the present invention.

What is claimed is:

1. A method of storing and retrieving a superblock of data codewords, comprising:
   providing sectorwise error correction codes in the data codewords;
   generating superblock error correction codes as functions of the data codewords; and
   storing the data codewords and the superblock error correction codes in a plurality of sectors in a storage medium; and
   retrieving the superblock error correction codes only if errors in the data codewords have failed to be corrected by performing on-the-fly error correction with sectorwise error correction codes.

2. The method of claim 1 further comprising:
   generating the superblock error correction codes as interleaved functions of the data codewords.

3. The method of claim 2 further comprising:
   generating the superblock error correction codes as even and odd interleave functions.

4. The method of claim 2 further comprising:
   generating the superblock error correction codes as at least three interleave functions.

5. The method of claim 2 further comprising:
   generating the superblock error correction codes as parity codes.

6. The method of claim 2 further comprising:
   generating the superblock error correction codes as checksum codes.

7. A method of retrieving selected data codewords from a superblock stored in multiple sectors of a storage medium, comprising:
   reading a selected sector of data codewords;
   performing on-the-fly error correction of the selected data codewords using sectorwise error correction; and
   when the sectorwise error correction fails to correct an error, performing second tier error correction comprising:
      reading a first superblock error correction sector associated with the error and reading data codewords in a first portion of the superblock associated with the first superblock error correction sector;
      performing superblock error correction of the first portion of the superblock; and
      providing the selected data codewords with the error corrected.

8. The method of claim 7 wherein the first superblock error correction sector comprises an interleaved superblock error correction sector.

9. The method of claim 8 further comprising:
   generating the superblock error correction codes as even and odd interleave functions.

10. The method of claim 8 further comprising:
    generating the superblock error correction codes as at least three interleave functions.

11. The method of claim 8 further comprising:
    generating the superblock error correction codes as parity codes.

12. The method of claim 8 further comprising:
    generating the superblock error correction codes as checksum codes.

13. A second tier error correction method, comprising:
    storing data with on-the-fly correction codes and with interleaved correction codes covering blocks of multiple sectors;
    reading a selected sector and, upon failure of on-the-fly error correction, finding an interleave number of the selected sector;
    reading remaining sectors with the interleave number and checking for on-the-fly errors in the remaining sectors; and
    if no errors are found in the remaining sectors, performing error correction of the failed sector with the interleaved correction codes.

14. The method of claim 13 wherein the superblock error correction codes are generated as functions of interleaved data codewords from the superblock.

15. The method of claim 14 wherein the interleaving comprises even and odd interleaving.

16. The method of claim 14 wherein the interleaving comprises interleaving in at least three interleave groups.

17. The method of claim 14 wherein the superblock error correction codes are parity codes.

18. The method of claim 14 wherein the superblock error correction codes are checksum codes.

19. A data storage device, comprising:
    a storage medium with a plurality of sectors storing a superblock, the superblock comprising sectors of data codewords that include sectorwise error correction codes, and that include sectors of superblock error correction codes that are functions of the data codewords; and
    a readback device retrieving a selected sector from the superblock, the readback device performing on-the-fly error correction with sectorwise error correction codes and performing superblock error correction using the superblock error correction codes.

20. The data storage device of claim 19 wherein the superblock error correction codes are interleaved functions of the data codewords.

21. The data storage device of claim 20 wherein the interleaved functions comprise even and odd interleave functions.

22. The data storage device of claim 20 wherein the interleaved functions comprise at least three interleave functions.

23. The data storage device of claim 20 wherein the superblock error correction codes comprise parity codes.

24. The data storage device of claim 20 wherein the superblock error correction codes comprise checksum codes.

* * * * *